United States Patent [19]

Regueiro

[11] Patent Number: 5,309,879
[45] Date of Patent: May 10, 1994

[54] DOUBLE OVERHEAD CAMSHAFT FOUR VALVE DIESEL ENGINE WITH SIDE PRECHAMBER

[75] Inventor: Jose F. Regueiro, Rochester Hills, Mich.

[73] Assignee: Chrysler Corporation, Highland Park, Mich.

[21] Appl. No.: 28,064

[22] Filed: Mar. 8, 1993

[51] Int. Cl.⁵ .......................... F02B 19/18; F02F 3/28
[52] U.S. Cl. .................................. 123/286; 123/302; 123/193.6
[58] Field of Search ............... 123/268, 275, 286, 302, 123/308, 315, 432, 193.6

[56] References Cited

U.S. PATENT DOCUMENTS

| | | | |
|---|---|---|---|
| 2,826,187 | 3/1958 | Meyer | 123/286 X |
| 3,259,116 | 7/1966 | Bricout | 123/286 X |
| 3,406,667 | 10/1968 | Evans et al. | 123/286 X |
| 3,945,365 | 3/1976 | Regueiro | 123/265 |
| 3,989,015 | 11/1976 | Rivere | 123/286 |
| 4,111,177 | 9/1978 | Regueiro | 123/265 |
| 4,669,431 | 6/1987 | Simay | 123/193.6 |
| 4,745,891 | 5/1988 | Cola | 123/193.6 |
| 4,938,191 | 7/1990 | Oldani et al. | 123/432 |
| 5,125,380 | 6/1992 | Nakae et al. | 123/302 X |

OTHER PUBLICATIONS

*Automotive Industries*, John McElroy, "Alternative Engines", Jan., 1980, pp. 43-48.
*Technology Review*, John Heywood and John Wilkes, "Is there a Better Automobile Engine?", Nov./Dec. 1980, pp. 19-29.
*Automotive engineering*, Stuart Birch, Jack Yamaguchi, Al Demmier & Kevin Jost, "Vehicles/Engines", Jun. 1992, vol. 100, No. 6, pp. 46-47.
*Diesel & Gas Turbine Worldwide Catalog*, Jan. 1985, Edition vol. 50, pp. 1268, 1315, 1319, 1321.

Primary Examiner—Willis R. Wolfe
Attorney, Agent, or Firm—Kenneth H. MacLean

[57] ABSTRACT

A four valve, double overhead camshaft diesel engine (10) has a precombustion chamber (30) with an angled and tapered transfer passage (60) leading to the main combustion chamber (44). The transfer passage (60) is tapered to provide a larger lower end (62) facing the main chamber (44) and smaller upper end (64) facing the pre-combustion chamber (30). The pre-combustion chamber is spherical, located on one side of the main combustion chamber. Air passing through the passage (60) during the compression stroke undergoes heating and swirling within the pre-combustion chamber. The piston has a domed upper surface with recessed lobes (20) and (22). Each recessed lobe functions as a valve pocket for the intake and exhaust valves (32) and (42).

14 Claims, 2 Drawing Sheets

DOUBLE OVERHEAD CAMSHAFT FOUR VALVE DIESEL ENGINE WITH SIDE PRECHAMBER

TECHNICAL FIELD

The field of this invention relates to internal combustion engines and more particularly to diesel engines having a pre-combustion chamber and a piston with recessed pockets.

BACKGROUND OF THE DISCLOSURE

High speed automotive diesel engines capable of 4500 to 5000 r.p.m. that have been in mass production are the Daimler-Benz engine or variations of the Ricardo "Comet" design. The engines have all been 2 valves; OHV or OHC design. Diesel engines have their own distinctive complications due to the high compression ratios needed to run these engines. Firstly, a strong bridge is desired in the cylinder head between the exhaust and intake valves to allow for sufficient strength and for providing in the "Comet" design, a coolant passage to pass through the bridge.

Secondly, valve lift during valve overlap with the piston at or near top dead center is reduced to prevent hitting the valves with the piston, due to the small clearance required between the valves and the piston to maintain the high compression ratios needed for operation. In theory, the maximum valve lift is in direct proportion to the inner seat diameter of the valve. Further valve lift beyond the calculated maximum valve lift provides for very little additional air flow due to the restriction of the diameter at the throat of the port. The valves on these prior art diesels are made substantially smaller than valves for an equivalent version of a gasoline spark ignition engine to allow for larger valve bridges to withstand the higher diesel firing pressures. The smaller size and reduced lift gravely affect the volumetric efficiency and air flow of diesel engines, especially prior-art engines with only two valves.

With two-valve engine technology compared to multi-valve engines, and high lifts on account of the large valve sizes; proper valve dynamics dictate very long valve periods to achieve high lifts. Mechanically, also, the spring forces are very high and that increases valve-train friction and power loss.

The valve lift is adversely affected at the critical valve overlap period when the intake valve is beginning to open and the exhaust valve is closing for these prior art two-valve engines use flat topped pistons (except for known combustion spectacles) and flat bottomed cylinder heads. The limitation of valve lift at this time affects the thorough flushing of the exhaust gases and inhibits the cylinder filling process for the subsequent cycle. The reduced valve lift during the overlap period, and the large valve periods force a late intake closing and an early exhaust opening. A late intake closing reduces the effective compression ratio with detrimental starting and running consequences, and greatly reduces the volumetric efficiency at low speeds. An early exhaust valve opening wastes energy and raises the exhaust gas and exhaust valve temperature which forces the use of more expensive and exotic high temperature valve and seat materials. An early exhaust closing raises the probability of a recompression spike, or "lock-up" at TDC during the scavenging or overlap portion of the cycle at high speed and high load, when in some engines, there is not sufficient real time available for a complete evacuation of the exhaust gases. Recompression spikes, apart from inhibiting the proper gas-flow process and reducing volumetric efficiency and power, consume power by creating negative work on the exhaust stroke near TDC. The exhaust valve closing should occur late enough during an extended overlap period with the intake valve to prevent a recompression spike near top dead center which is a difficult objective to obtain due to the piston being near top dead center.

Diesel engines tolerate these problems at low speeds. The operation at low speed provides sufficient time for the air flow through the intake and exhaust valves to pass into and out of the cylinder even with a delayed intake valve opening or early exhaust valve closing. Speeds increased slowly as fuel systems, materials and lubrication improved and engine sizes were reduced. The problems associated with valve timing and air flow lag become magnified at high speeds. Moreover, the high compression ratios of a conventional high-speed I.D.I. diesel engine with the piston at top dead center being very close to the valves dictate that the intake valves cannot be opened early due to crashing into the piston and the exhaust valve cannot be closed late due to the crashing of the piston into the exhaust valve. The unnatural valve timings detract from the potential high-speed capability of these type of diesel engines.

A major compromise of these prior-art high-speed, 2-valve engines results when the valve opening duration must be extended at high speed to improve the volumetric efficiency lost by the lack of proper overlap. In every case, the intake valve closes excessively late in the compression stroke, and the effective compression ratio, effective compression pressure and effective compression temperature are too low even for the high speeds. When such engines run at low speeds, the same applies, but in addition, the volumetric efficiency suffers because the upward piston motion on the compression stroke "spit-back" into the intake manifold the air which has already been admitted into the engine and for which energy has been spent. Negative work (more energy wasted) also results from returning certain amounts of this already-admitted air back into the intake manifold. The situation is further aggravated at cranking speeds, especially cold when the batteries are weak and the oil is thick and said speeds are in the order of 100-150 rpm. The effective compression ratio and volumetric efficiency (i.e. compression pressure and temperature) under said conditions is lowered so much that cold startability is greatly affected or impossible.

Another compromise is when engines attempt to use the same components for both gasoline and diesel engines. In the past, gasoline and diesel engines did not have many components that were interchangeable. Neither engine could be economically and feasibly converted to the other type. This makes diesel engines less desirable because of its lower sales volume.

Lower speed diesel engines running up to 2600 r.p.m. have been developed with four valves to circumvent the breathing and valve timing problems of their prior art two valve counterparts. The use of four valves decreases the restriction of air flow through the valve openings. It is common to have a 40% increase in total air flow cross-section as compared to a conventional two valve cylinder head engine. Since each valve is smaller compared to a two valve cylinder head assembly, the lift can be reduced. The stem can also be made smaller in diameter, shorter and with less mass. Because each valve is lighter, the springs can be made softer.

The softer springs provide for a more efficient engine. Because there is decreased lift for each valve, the cams on the cam shaft are often contoured, if desired, for less valve duration with reduced valve dynamic problems. Furthermore, the timing in which the valve needs to be open can be shortened because there is less lift to contend with even with the same valve accelerations. A further improvement results from lower exhaust valve temperatures since each smaller valve has less ratio of surface heat pick-up area to seat heat rejection area and runs much cooler. Furthermore, with the larger valve opening areas but overall smaller diameter valves, the designer can afford to make slightly wider bridges and such bridges are shorter in length, which, added to the lower valve temperature, results in much lower valve head deflections and longer valve and seat life. Additionally, with shorter valve periods the exhaust valve spends less time open, exposed to the exhaust gases, and more time closed and rejecting heat, which lowers the valve temperature even further.

The few known four valve diesel engines by Caterpillar and Continental Motors had a centrally located pre-combustion chamber with a large diameter transfer passage between the pre-combustion chamber and main combustion chamber. The burn or combustion duration was short enough for these lower speed engines but are not short enough to be adapted to high speed diesel engines. Furthermore, the pistons in these diesel engines tended to have heat checking and cracking due to the torch like flame exiting the pre-combustion chamber and impinging at a near perpendicular angle onto the piston surface. These engines suffered from two extra combustion drawbacks: first, by the disposition of their valve train, with pushrods, rocker arms and rocker arm bridges operating the valves, the two intake (and the two exhausts) were in an axis transversal to the main axis of the engine and their porting and flow characteristics were not what would be considered appropriate today. With such disposition of the valves, swirl, or rotational air movement about the cylinder axis, was generated and, although swirl may have been welcomed by the general philosophy of the combustion chamber, it was a weak swirl field and a high air-flow penalty was taken in order to generate it. Secondly, the straight transfer passage of the pre-cup did not promote swirled air motion into the pre-cup. The results were more combustion knock, $NO_x$, Hydrocarbons, smoke and particulate than a swirling pre-cup could have provided. Yet, both the Caterpillar and the Continental Motors engines were the first engines certified for low emissions, meeting the 1975 truck emission standards.

Modifications to pistons have also increased efficiency of engines. Many engines have a piston with a recess to form part of the combustion chamber or to enhance air swirl. The "Comet" diesel engine had a "spectacle-shaped" recess in its piston to form the main combustion chamber. It was not aligned or coordinated with the valves to act as a pocket to increase the clearance between the valves and the piston at TDC. All previous cylinder heads that helped air tumble have been limited to gasoline spark ignited engines. What is needed is a high-speed diesel engine with highly improved air flow and power output with lower fuel consumption, smoke, particulates and gaseous emissions, improved startability and reduced combustion noise and harshness, and offering increased durability of valves and piston. Means must be provided to achieve such objectives, such as a direct-acting double overhead camshaft configuration to achieve a lightweight, low stress, low power consumption, stiff and quiet valve train with superior air flow characteristics, and a combustion system capable of accomplishing fast and clean combustion both in the early (pre-combustion, in the precombustion chamber) and late (main chamber) combustion.

The subject of this patent provides all the elements to achieve such results in a modern, relatively inexpensive engine package, with a possible cylinder head even converted from appropriate gasoline engine counterparts featuring the airflow capacities of a four valve design with a zero or narrow valve-included angle and DOHC, preferably a mechanically stiff direct-acting design with shorter valve periods, increased effective compression ratio and decreased nominal compression ratio, with a highly turbulent mixture generated in the pre-chamber for quick ignition and fast burn, followed by combustion in the main chamber being characterized as a fast process based on a combination of air tumble, squish, mixing with the fuel and products of combustion exiting from the pre-chamber and burning quickly and efficiently by maintaining said prechamber products airborne while mixing and burning with the air in the main chamber. The process takes advantage of, and is based on, appropriate recesses incorporated in the piston which, apart from functioning as mini-combustion chambers, also provide for valve pockets to allow for the proper valve events and lifts without combustion or manufacturing compromises, and which contribute to an even thermal loading. Earlier intake closing and higher effective compression ratio allow the lowering of the nominal compression ratio which in turn allows for more volume in the pocket to keep the flame and the fuel-air mixture airborne. The combination of volumetric efficiencies and valve timings providing previously unheard of startability, smooth, quieter combustion and reduced firing pressures, even while producing increased power outputs, with lower fuel consumption, smoke, particulate and gaseous emissions than any previously known high speed, I.D.I. diesel engine.

SUMMARY OF THE DISCLOSURE

In accordance with one aspect of the invention, an internal combustion engine has a cylinder and a piston reciprocally movable in the cylinder. A cylinder head is secured over the cylinder and piston to form a combustion chamber. At least one intake port and preferably two, extend through the cylinder head and an intake valve is mounted at each port through the cylinder head for allowing air to be admitted into the combustion chamber. At least one exhaust port, preferably two, extends through the cylinder head and two exhaust valves are mounted at each port through the cylinder head for allowing exhaust gases to exit he combustion chamber. The valves are preferably actuated by directly operated twin overhead cam shafts. A pre-combustion chamber is in communication with the combustion chamber and houses the tip of a fuel nozzle and a heating element (a glow plug for cold starting).

The precombustion chamber has a tapered transfer passage communicating with the combustion chamber and directed along a center line of the cylinder that intersects the longitudinal axis of the cylinder. The passage has a narrow open end facing the pre-combustion chamber and a wide open end facing the combustion chamber. From a combustion aspect, the best location for the precombustion chamber would be on the outside of the exhaust valves, with air tumble helping induce the flow into the chamber during compression but with the raw fuel and partially burned products of combustion exiting the prechamber in counterflow to the tumble for improved mixing and very fast burn. In some applications, like turbocharged engines, the exhaust-side location may be impractical. With such packaging considerations, the prechamber can be located on the outside of the intake valves. Although this arrangement would result in a reduction of the relative valve sizes, the tumble does not need to be as strong, and the intake ports can be designed to favor flow rather than to induce tumble, therefore recovering some of the flow losses incurred due to the reduction of valve sizes. An additional benefit from this arrangement would result from the fuel pump and nozzles being in the same side of the engine (the cool side) and with the less than vertical position of the nozzles, very short high-pressure fuel lines, can be used for improved injection dynamics.

The piston is domed i.e., higher in the center than on the sides. The angle of the dome preferably similar to the valve included angle and the pentroof angle of the fire deck of the cylinder head. The piston has a plurality of recessed lobes in its domed top surface circumferentially spaced about a central axis of the piston. The longitudinal axis of each transfer passage at the wide end is aligned with a center of a respective recessed lobe and is canted with respect to the domed top surface of the piston at an acute angle. Each intake and exhaust valve is vertically aligned over a respective recessed lobe and sized to fit within the recess lobe when in the partially open position when the piston is near TDC to provide more overlap. In one embodiment, the passages that are aligned with the center of the recessed lobes under respective intake valves have a greater diameter than the passages that are aligned with the recessed lobes under the respective exhaust valves. In another embodiment, the lobes in cross section, have a minimum depth at the outer periphery of the lobes just sufficient to allow proper valve operation without crashing into the pistons. The lobes, all of them or just the ones under the intake valves, may be dished to be deeper in the center.

BRIEF DESCRIPTION OF THE DRAWINGS

Reference now is made to the accompanying drawings in which.

DETAILED DESCRIPTION OF THE PREFERRED EMBODIMENT

Figure 1:
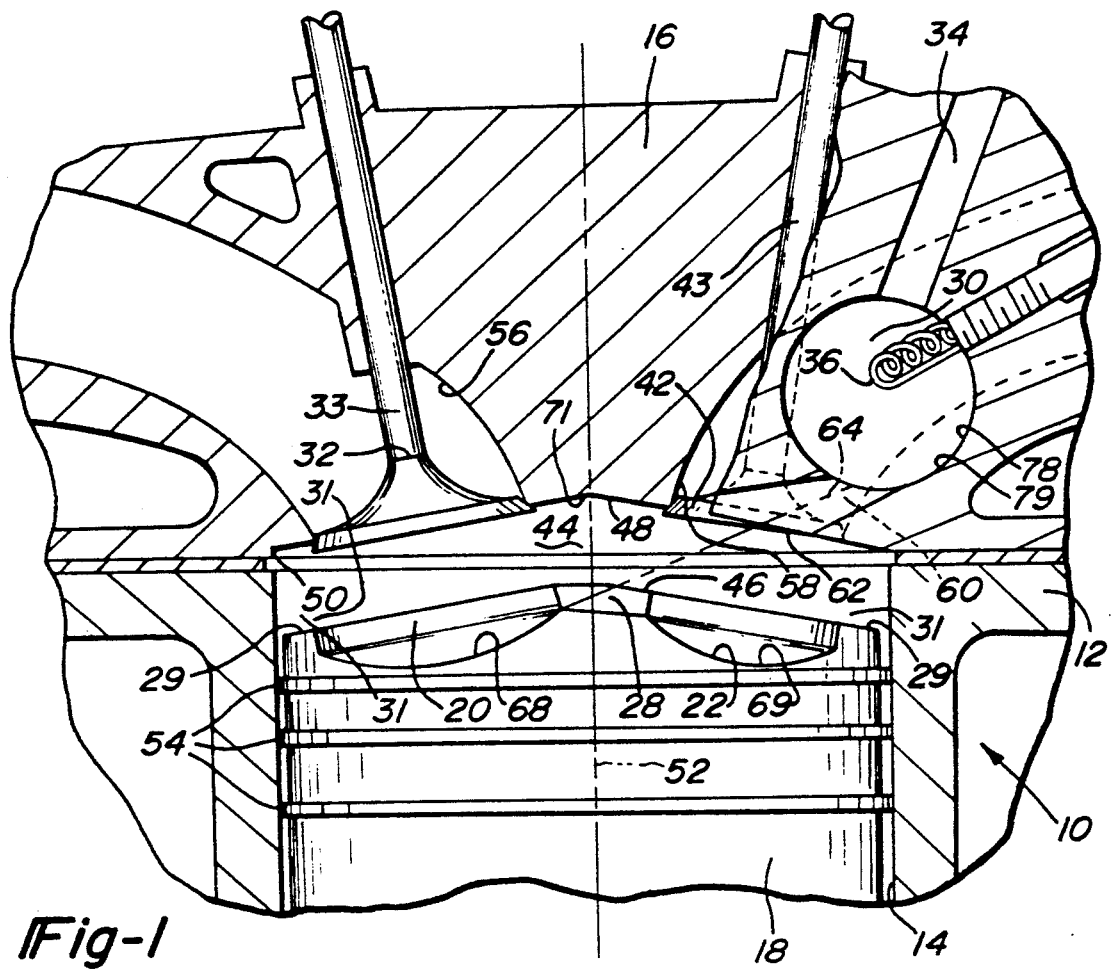
FIG. 1 is a segmented side elevational view of a cylinder and piston assembly for a diesel engine illustrating an embodiment of the invention.

Referring now to FIG. 1, an internal combustion engine 10 includes a cylinder head 16 and an engine block 12 with at least one cylinder 14 and at least one piston 18. Only one cylinder 14 and piston 18 are shown with the understanding that any other cylinder and piston in the engine 10 are substantially identical in structure and function, and therefore, are not individually described. A cylinder head 16 is mounted on block 12. Each piston 18 is conventionally connected to a crankshaft through piston pins and connecting rods. The crankshaft is connected via a timing mechanism (gears, chains or belts) to twin overhead camshafts that operate the intake valves 32 and exhaust valves 42. The connecting rods, crankshaft, timing mechanism, overhead camshafts and other valve train components are conventional and therefore for simplicity of the drawing are not illustrated.

A pair of intake valves 32 and exhaust valves 42 are associated with each cylinder 14. Reference to direction such as top, bottom, up, down, vertical, or horizontal will be made relating to the engine as shown in FIG. 1 with its conventional arrangement for a motor vehicle. It should be understood that the engine itself may be repositioned or reoriented such as rotated about its longitudinal or transverse axis without affecting the invention.

The cylinder 14, piston 18, and cylinder head 16 form a combustion chamber 44. The piston 18 has a top surface 46 that defines the bottom wall 46 of the chamber 44. The cylinder head 16 forms a top surface 48 of the chamber 44. The cylinder 14 and cylinder head 16 together form the side wall 50 of chamber 44. The longitudinal central axis of the cylinder 44 is indicated at 52. The piston 18 has a ring pack 54. The cylinder head 16 has intake ports 56 and exhaust ports 58 in communication with the respective pair of intake valves 32 and pair of exhaust valves 42. The valves 32 and 42 have a maximum valve included angle of less than 30° and is preferably approximately 20–25° as shown in FIG. 1.

Figure 3:
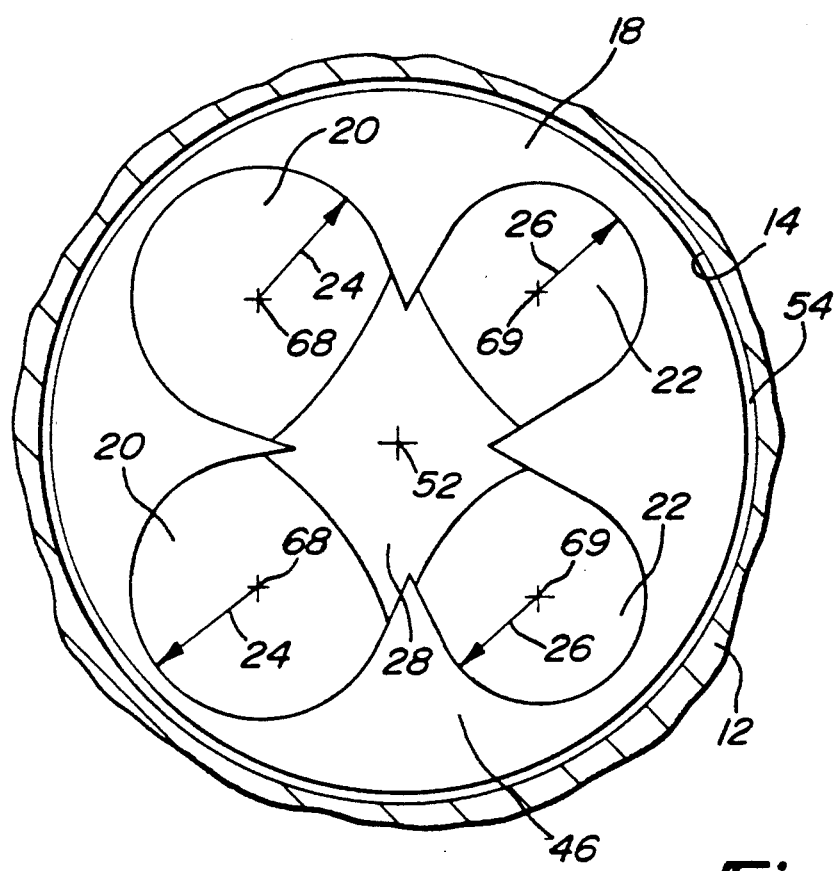
FIG. 3 is a cross-sectional view taken along lines 3—3 in FIG. 1.

As shown in FIGS. 1 and 3, the piston surface 46 is domed in cross-section to conform to the pentroof angle of the head 16 and has a recessed area 19 that resembles a clover leaf shape. The recessed area 19 has four recessed lobes 20 and 22 circumferentially spaced about central axis 52 as clearly shown in FIGS. 1 and 7 that function as valve pockets and as part of the combustion chamber. Two recessed lobes 20 have a radius 24. The recessed lobes 20 are located and sized to receive the intake valves 32 when the valves are in the partially open position and the piston 18 is at or near TDC. The other two recessed lobes 22 have a radius 26. The recessed lobes 22 are located and sized to receive the exhaust valves 42 when the valves 42 are in the partially open position and the piston 18 is at or near TDC.

The piston has a generally circular horizontal cross-section and the lobes 20 and 22 are circumferentially spaced about at substantially 90 degrees intervals about the central axis 52.

Recessed lobes 20 are larger than recessed lobes 22. The outer periphery of each lobe 22 and 24 is deep enough to receive the respective valves when in the partially open position during the valve overlap period. The stems 33 and 43 of the respective valves 32 and 42 are aligned with the centers 68 and 69 of the lobes 20 and 22 such that the valves 32 and 42 are received normal to the plane of the recessed lobes 20 and 22. The angle of the lobes is such that the stems 33 and 4 of respective valves 32 and 42 are transverse to the respective plane in which the respective lobe lies. The centers 68 and 69 may be concavely dished to be deeper than the peripheries of lobes 22 and 24. It is foreseen that in certain applications, it is desired to machine the recessed lobes with flat bottoms of equal depth. Each recessed lobe 20 and 22 is joined in a common recessed center area 28 located at the central longitudinal axis 52. Whether the lobes have flat bottoms or concavely dished bottoms, the recessed lobes 20 are configured to have a greater volume than lobes 22. The recessed lobes 20 and 22 and central area 28 have preferably just enough depth to provide valve head clearance, minimize burning plume impingement while maintaining the plume airborne.

The piston periphery section 29 forms a squish area 31 of the combustion chamber 44 with the surface 48 of cylinder head 16. The squish area 31 allows more volume to be adjudicated to the lobes 20 and 22 and promotes rapid air motion into said volumes as the piston reaches TDC on its compression stroke for faster mixing and burning with the flames exiting out of the prechamber through the transfer passage (which have not yet been described).

A pre-combustion chamber 3 is located toward the periphery of the cylinder. The chamber 30 is located above main combustion chamber 44 preferably between the exhaust valves 42 toward the periphery of the cylinder. The chamber 30 has a conventional fuel injector 34 operably mounted thereto. A conventional glow plug or other type of heating element 36 is also operably mounted to the pre-combustion chamber 30. The pre-combustion chamber 30 can be conventionally built into the cylinder head 16 with its bottom section 37 being a conventional insert of a high strength temperature resistant stainless steel or ceramic material. The pre-combustion chamber 30 has a generally spherical shape with circular cross-sections along both the vertical and the horizontal direction.

Figure 2:
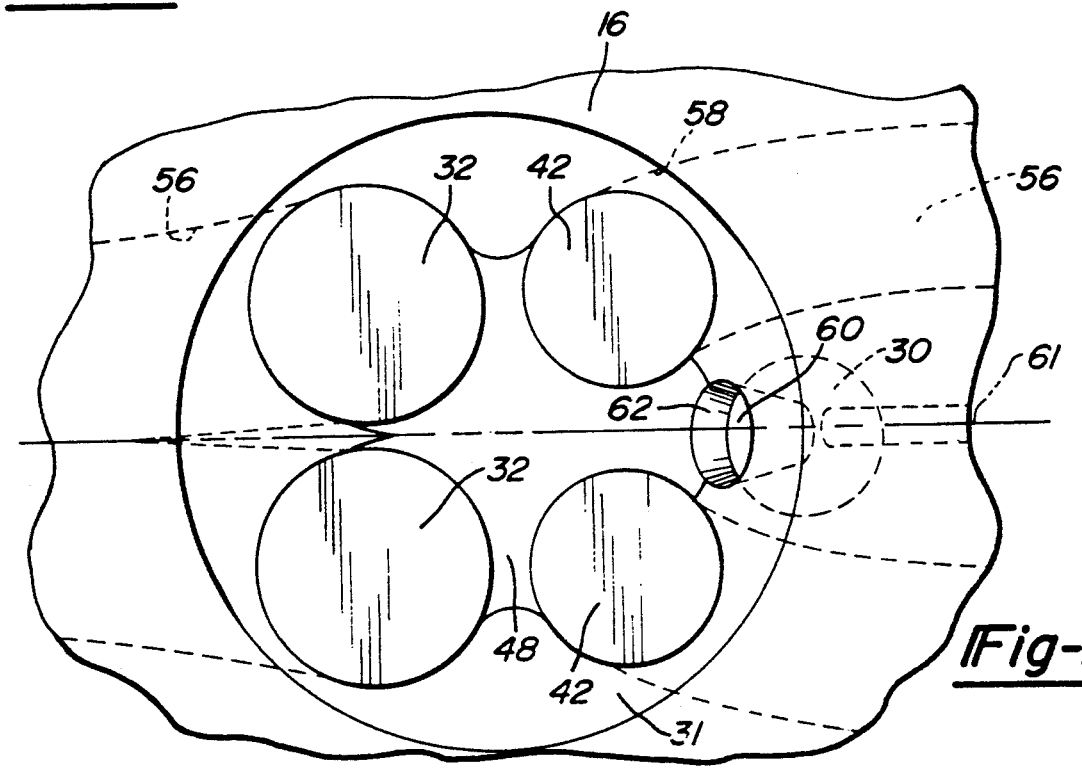
FIG. 2 is a cross-sectional view taken along lines 2—2 in FIG. 1.

A transfer passage 60 passes through the lower section 37 of the precombustion chamber 30 to the main combustion chamber 44. As shown in FIGS. 2 and 3, the passage 60 is aligned with the center line 61 that transversely intersects the central longitudinal axis 52. The passage 60 is tapered with its open lower end 62 that faces the main chamber 44 being larger than the open upper end 64 facing the pre-combustion chamber 30.

For manufacturing purposes, the passage 60 is straight as illustrated in FIGS. 1 and 2. However, the passage 60 need not be straight and may be curved between the main combustion chamber and precombustion chamber.

In either the case of a straight passage or a curved passage, the peripheral wall 79 of the passage 60 at upper end 64 is angled and positioned such that it is approximately tangential with the side wall 78 of the pre-combustion chamber 30. The passage 60 is angled with respect to the central longitudinal axis 52 as shown in FIG. 1. The longitudinal axis 66 of a respective passage 60 at the lower end 62 is angled and positioned to form an acute angle with the upper surface of the piston, preferably so that it lines up with the inboard edge of the pockets 20 when the piston is at TDC. The center section 2 between the four pockets may be sloped down towards the pockets 20 or concavely dished to facilitate the motion of the products leaving the prechamber into the deeper pockets 28 as well as to avoid excessive torching of the piston top.

In operation, at the end of the exhaust stroke and the beginning of the intake stroke, both the exhaust valves 42 and intake valves 32 may be partially opened during an overlap period. At this time, the piston 18 is at or near TDC and its periphery 29 forms squish area 31 with the upper chamber surface 48. The opening and closing of the valves is not affected because the valves 32 fit within lobes 20 and exhaust valves 42 fit within lobes 22.

During the intake stroke, the intake valves 32 fully open. The valves 32 are as large as practical to lessen any air resistance to provide the most air to enter the cylinder and increase the volumetric efficiency of the engine.

With four valves, intake valve closing is earlier than with two valves due to the realities of life with valve dynamics and air flow. Also, that by providing more overlap on top the intakes can be closed much earlier than a two valve engine and increase the effective compression ratio as well as the trapped volumetric efficiency for greatly improved cold startability.

During the compression stroke, as the air is compressed, some of the air passes through the passage 60 into pre-combustion chamber 30. The air is heated by three functions; firstly, the compression process, and secondly, the air draws heat off the hottest part of the engine, namely near the center line 52 of the combustion chamber as it passes by the center point 71 of the cylinder head 16 while continuing to tumble during compression. Thirdly, the air is also heated as it is squeezed through the very hot transfer passage 60 into the pre-combustion chamber 30. The tangential nature of the passage wall 69 and the circular side wall 68 of the pre-combustion chamber 30 causes the air to undergo a swirling motion in the pre-combustion chamber 30. The heating of the air and swirling motion of the air in the pre-combustion chamber enhances the mixing and break-up of the fuel particles injected into the pre-combustion chamber, promoting ignition of the fuel and a fast burn. Air drawing heat off the transfer passage during operation also cools it and helps its durability.

The glow plug 36 is actuated as needed. At sufficient compression, the fuel-air mixture within the pre-combustion chamber ignites. The smaller explosion relative to open chamber diesels reduces the initial diesel knock commonly associated with diesel engines. Also, the pintle-type nozzle tips typically read with I.D.I. engines in most cases have "throttling" characteristics which reduce the amount of fuel injected during the delay period resulting in both a shorter delay and much quieter combustion. The combustion proceeds with the hot combustion mixture passing back down through the passage 60 and aimed toward the main combustion chamber 44 where the combustion or burn continues. To alleviate the torch-like effect of the burning mixture upon the piston top, the longitudinal axis 66 at the lower end of the prechamber 62 is set at a shallow angle, and the piston top itself is contoured to avoid the flame impinging directly and harshly against the top of the piston.

The intake valves 32 ar normally cooler than the exhaust valves 42 due to the fact that cool intake air is constantly cooling the intake valves 32 during the intake stroke while on the other hand hot exhaust gases are constantly heating the exhaust valves 42 during the exhaust stroke. The air within the two lobes 20 is closer to the cooler intake valves 32 than the air within the two lobes 22. Consequently, the air within the lobes 22 is heated and expands. Conversely, the air within the lobes 20 is denser and cooler than the air in the two lobes 22. It is desired that the lobes 20 be larger than the lobes 22 to take advantage of the thermal differences between the lobes 20 and 22. The passage 60 is aimed such that the flame front travels toward the lobes 20 with the denser cooler air. The fastest combustion is then produced with the lowest thermal loading on any section of the piston to prevent heat checking and cracking of the piston crown.

With cross-flow four valve cylinder heads, as described, the construction of the inlet ports may be easily designed to produce air tumble about a horizontal axis in the cylinder. The air tumble may be used to enhance the burn velocity by having the air moving in a counterflow to the fuel and combustion plume exiting out of the transfer passage 60 and providing even better, cleaner and more efficient combustion with increasingly even thermal loading of the piston top for increased durability.

The decreased thermal loading may help to, in some cases, eliminate the need for piston cooling oil jets which produces significant savings in both engine production costs and engine operating costs. It is known that piston cooling oil jets contribute to increase ring and piston friction as well as oil consumption. The elimination of the cooling jets can provide for improved piston and liner (or cylinder wall) oil drainage and reduced oil consumption, as well as allowing for lowered-tension piston rings. Secondly, the oil pump may be reduced in sized and the power demand of the oil pump is reduced. A significant increase in power, fuel efficiency and a decrease in specific $NO_x$ and HC, ring and cylinder wall wear, are a result of applicant's pre-combustion chamber and piston construction which provides for more efficient combustion and thermal loading.

The combination of the side precombustion chamber, piston with recessed valve receiving pockets and multi-valve porting of each cylinder provides for a diesel engine which can be easily modified for specific applications. Due to the redundancies built into the design in allowing shorter durations of valve opening or allowing earlier valve openings and closings into the piston pockets, the engine can be modified in a variety of ways. In all cases, startability, driveability, noise and emissions during and immediately following cold start are greatly improved.

Variations and modifications are possible without departing from the scope and spirit of the present invention as defined by the appended claims.

The embodiments in which an exclusive property or privilege is claimed are defined as follows:

1. A piston for an internal combustion engine, the piston characterized by:
   said piston being domed at its upper surface;
   said piston has a plurality of recessed lobes circumferentially spaced about a central axis of said piston;
   said recessed lobes having one of a flat bottom and a concavely dished bottom;
   said recessed lobes being sized to receive a valve therein;
   said lobes having two different sizes with larger lobes receiving intake valves and smaller lobes receiving exhaust valves.

2. A piston as defined in claim 1 further characterized by said piston having a substantially circular shape along it horizontal cross-section.

3. A piston as defined in claim 2 further characterized by;
   said recessed lobes positioned approximately at 90 degree intervals about said central axis of said piston.

4. In an internal combustion engine having a cylinder and a piston movably disposed in said cylinder for reciprocal motion, a cylinder head secured over said cylinder and piston to form a combustion chamber, a pair of intake ports extending through said cylinder head and an intake valve operably mounted in a respective intake port for allowing air to be admitted into said combustion chamber, and a pair of exhaust ports extending through said cylinder head and an exhaust valve operably mounted in a respective exhaust port for allowing exhaust gases to exit said combustion chamber; the improvement characterized by:
   a pre-combustion chamber having a tapered transfer passage communicating with said combustion chamber with a narrow open end of said passage being in proximity to said pre-combustion chamber and a wide open end of said passages being in proximity to said combustion chamber;
   said tapered transfer passage having a longitudinal axis acutely angled with respect to an upper surface of said piston;
   said piston having a plurality of recessed lobes circumferentially spaced about a central axis of said piston;
   each intake and exhaust valve being aligned along its stem axis over a respective recessed lobe and sized to fit within said recessed lobe when in the partially open position and when said piston is at or near TDC.

5. An internal combustion engine as defined in claim 4 further characterized by;
   each intake and exhaust valve having its respective valve stem aligned transversely with the plane of the aligned recessed lobe.

6. An internal combustion engine as defined in claim 5 further characterized by;
   the respective recessed lobes aligned under said respective intake valves being larger than the respective recessed lobes aligned under said respective exhaust valves.

7. An internal combustion engine as defined in claim 4 further characterized by;
   the respective recessed lobes aligned under said respective intake valves being larger than the respective recessed lobes aligned under said respective exhaust valves.

8. In an internal combustion engine having a cylinder and a piston movably disposed in said cylinder for reciprocal motion, a cylinder head secured over said cylinder and piston to form a combustion chamber, a pair of intake ports extending through said cylinder head and an intake valve operably mounted in a respective intake port for allowing air to be admitted into said combustion chamber, and a pair of exhaust ports extending through said cylinder head and an exhaust valve operably mounted in a respective exhaust port for allowing exhaust gases to exit said combustion chamber; the improvement characterized by:
   a pre-combustion chamber having a transfer passage communicating with said combustion chamber, said precombustion chamber being positioned above an eccentric side section of said cylinder between said two exhaust valves and in proximity to a periphery of said exhaust valves that face an outer periphery of said cylinder.

9. An internal combustion engine as defined in claim 8 further characterized by;
   said piston has a plurality of recessed lobes circumferentially spaced about a central axis of said piston.

10. An internal combustion engine as defined in claim 9 further characterized by;
    each intake and exhaust valve being aligned along its longitudinal axis with a respective recessed lobe and sized to fit within said respective recessed lobe when in the open position and when said piston is near at or TDC.

11. An internal combustion engine as defined in claim 10 further characterized by;

the respective recessed lobes that are aligned under said respective intake valves being larger than the respective recessed lobes that are aligned under said respective exhaust valves.

12. An internal combustion engine as defined in claim 11 further characterized by;

each intake and exhaust valve having its respective valve stem aligned transversely with the plane of the aligned recessed lobe.

13. An internal combustion engine as defined in claim 10 further characterized by;

each intake and exhaust valve having its respective valve stem aligned transversely with the plane of the aligned recessed lobe.

14. An internal combustion engine as defined in claim 13 further characterized by;

said piston being domed at its upper surface;

said piston has a plurality of recessed lobes circumferentially spaced about a central axis of said piston;

said recessed lobes having one of a flat bottom and a concavely dished bottom;

the longitudinal axis of said passage at said second open end being canted with respect to the upper surface of said piston at an acute angle.

* * * * *